(12) United States Patent
Loase et al.

(10) Patent No.: US 8,583,382 B1
(45) Date of Patent: Nov. 12, 2013

(54) TORQUE DATA LOGGING APPARATUS, SYSTEM, AND METHOD

(75) Inventors: James C Loase, Rock Creek, OH (US); Michael Mihalik, Cuyahoga Falls, OH (US); Bethany Reinhardt, Northfield, OH (US)

(73) Assignee: Pneumatic Scale Corporation, Cuyahoga Falls, OH (US)

( * ) Notice: Subject to any disclaimer, the term of this patent is extended or adjusted under 35 U.S.C. 154(b) by 1311 days.

(21) Appl. No.: 12/270,596

(22) Filed: Nov. 13, 2008

Related U.S. Application Data

(60) Provisional application No. 60/987,718, filed on Nov. 13, 2007.

(51) Int. Cl.
*G01L 3/00* (2006.01)
*G01D 18/00* (2006.01)
*B67B 3/00* (2006.01)

(52) U.S. Cl.
USPC .......................... 702/41; 702/104; 53/331.5

(58) Field of Classification Search
USPC .................. 702/41, 33, 34, 42, 104; 73/761, 73/763–766, 814, 847, 855; 53/331.5, 53/317, 319, 331, 483
See application file for complete search history.

(56) References Cited

U.S. PATENT DOCUMENTS

| | | | | |
|---|---|---|---|---|
| 5,415,050 | A * | 5/1995 | Trendel et al. | 73/862.23 |
| 6,105,343 | A * | 8/2000 | Grove et al. | 53/490 |
| 7,059,202 | B2 * | 6/2006 | Stanos et al. | 73/862.044 |
| 8,001,748 | B2 * | 8/2011 | Schulz et al. | 53/471 |
| 2005/0022478 | A1 * | 2/2005 | Zalkin et al. | 53/478 |
| 2006/0162285 | A1 * | 7/2006 | Haynes et al. | 53/317 |
| 2010/0101192 | A1 * | 4/2010 | Krevald | 53/490 |

* cited by examiner

*Primary Examiner* — Marc Armand
*Assistant Examiner* — Ricky Ngon
(74) *Attorney, Agent, or Firm* — Walker & Jocke Co., LPA; Nancy L. Reeves

(57) ABSTRACT

The apparatus, system, and method provides an instrumented container with a contour similar to that of a production container which includes two portions spaced apart and joined by a torque sensor. The instrumented container also includes a processor which directs the periodic sampling of data measured by the torque sensor during the capping process, and a memory which stores a plurality of data values. The apparatus, system, and method provides a reusable instrumented container form to which a portion of an actual production container may be attached. The instrumented container is indistinguishable, for purposes of the capping line, from a regular production container. It may thus be used to test individual spindles, randomly test application torque, verify set application torques, and provide accurate information as to the impact of a particular dye or other variable on bottle capping.

19 Claims, 14 Drawing Sheets

TORQUE DATA LOGGING APPARATUS, SYSTEM, AND METHOD

CROSS REFERENCE TO RELATED APPLICATION

This application claims the benefit of U.S. Provisional Application No. 60/987,718 filed Nov. 13, 2007 and the disclosures of this Provisional Application are incorporated herein by reference.

TECHNICAL FIELD

This invention relates to the automated installation of screw caps on threaded containers. More specifically this invention relates to an apparatus and method to measure and record a plurality of application torque measurements in real time as a screw cap is installed on a threaded container.

BACKGROUND ART

Threaded caps used to seal correspondingly threaded containers are generally known as screw caps. Screw caps for containers are ideally tightened to a predetermined torque. This predetermined torque is selected so that it will close the container sufficiently tightly to avoid loss, deterioration, or contamination of the contents during transportation and storage. The torque may not be too high, however, or the screw cap will be tightened so tightly that it cannot be opened manually, or that it damages the screw cap, the container, or both. This predetermined torque is generally referred to as the application torque.

Acceptable tightness is generally determined by running a number of containers through the capping process, then measuring the torque required to remove the screw cap. The torque necessary to remove properly tightened containers is generally known as the removal torque. The removal torque must then be correlated with the application torque which was used to produce it in order to determine an optimum application torque. This correlation may vary from machine to machine and between the various spindles on a turret.

In addition, this correlation is generally container and cap specific. There are a number of factors specific to a cap and container that influence how much application torque is required to produce the desired removal torque. Current means of determining the optimum application torque are limited because they rely on evaluation of the torque used to apply screw caps to similarly shaped mock containers, rather than to the production container itself. Because the required application torque may vary in response to such seemingly unrelated factors as color of the dye used in the plastic from which the container is formed, the use of mock containers provides an imprecise measurement of the application torque required.

Current means of measuring the application torque are also limited because they are based on a single maximum torque which is reached during the application process. That maximum torque provides limited and potentially misleading information about the capping process and potentially about when the maximum torque was reached during this process. This single maximum torque does not necessarily correlate to the application torque needed to create a particular removal torque. For example, an artificially high maximum torque may be recorded if the screw cap is initially cross threaded, creating a peak torque early in the application process. As the screw cap slips back into proper thread alignment and then tightens properly it may only reach a torque lower than the application torque recorded earlier when the screw cap was cross threaded. There may also be problems setting the application torque if the desired removal torque is achieved by a wide range of application torques, or by a range of application torques which are internally inconsistent. In this case, it would be helpful to have more complete application torque information. If such information is available it can be analyzed to help identify capping problems or which torque patterns are most typical.

Finally, it would be useful to have the ability to independently check the torque applied by the capper machine for accuracy. The capper machine itself may be malfunctioning in a way that makes it appear to be applying a certain torque during the capping process when the application torque is actually different than the capping machine is reporting.

Thus there exists a need for a method and apparatus to measure the amount of torque which is applied when tightening specific cap and production container combinations, when using a specific machine or spindle on a particular turret, or which can generate a plurality of measurements that can be used to evaluate the torque which is applied throughout the capping process.

DISCLOSURE OF INVENTION

It is an object of the present invention to provide an apparatus for monitoring the application torque as a screw cap is threaded onto a threaded container.

It is a further object of the present invention to provide a method for monitoring the application torque over a period of time as a screw cap is threaded onto a threaded container.

It is a further object of the present invention to provide an apparatus that will record measured application torque during the period during which a screw cap is threaded onto a threaded container.

It is a further object of the present invention to provide an apparatus to monitor the application torque as a screw cap is threaded onto a threaded container which is made from the same material and molds as the actual containers which are intended to be capped.

It is a further object of the present invention to provide an apparatus that can be used to verify the torque actually applied by a particular capping machine.

The foregoing objects are accomplished in an embodiment of the invention by an instrumented container which has a base of the same size and shape as the container to be capped (referred to herein, generally, as a production container), a threaded component which is formed from the threaded portion of a representative production container, an embedded torque sensor, an embedded processor, and a data store or memory to record a series of torque measurements over time as the instrumented container is capped, and application software which captures, records, and displays the data for one or more of such instrumented containers.

Further objects of the present invention will be made apparent in the following Best Mode For Carrying Out Invention and the appended claims.

BEST MODE FOR CARRYING OUT INVENTION

Figure 1:
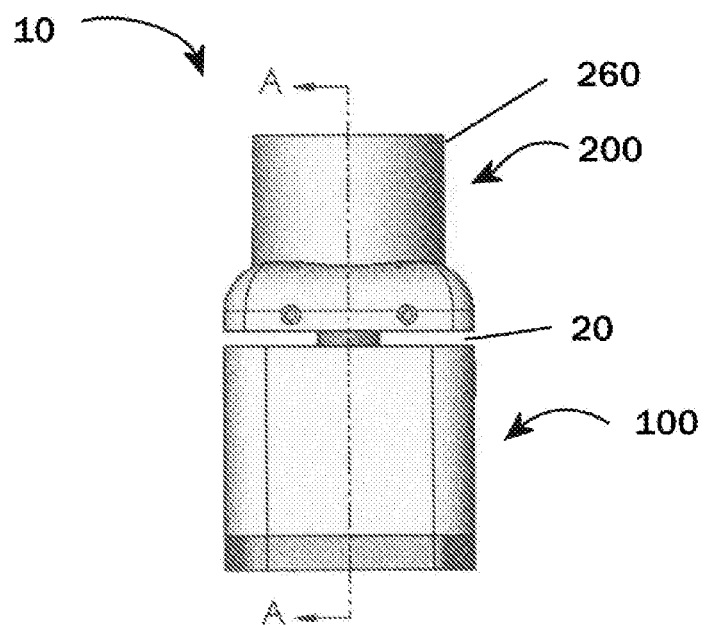
FIG. 1 is a side view of one embodiment of an instrumented container.
Figure 12:
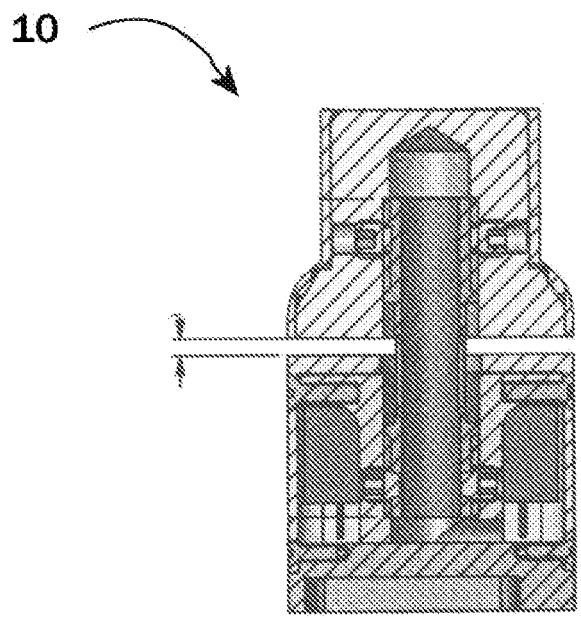
FIG. 12 is a cross sectional view of one embodiment of an instrumented container.
Figure 15:
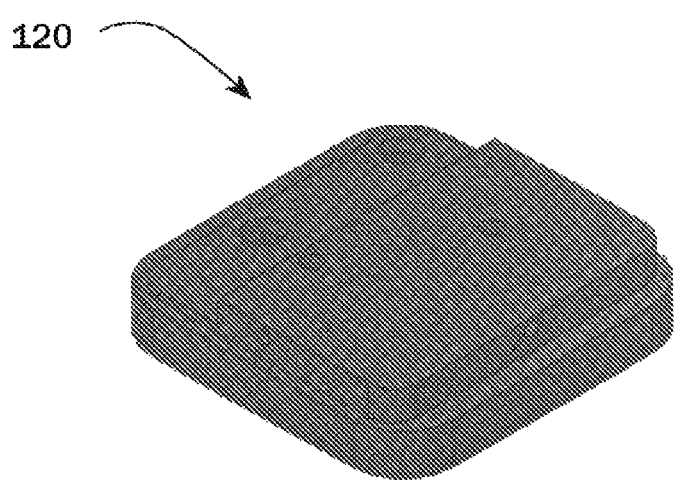
FIG. 15 is a side elevational view of one embodiment of a base.

An exemplary embodiment of an instrumented container 10 is shown in FIG. 1. An instrumented container 10 comprises a container assembly 100, including a container body 110 (illustrated in FIG. 6) and a base 120 (illustrated in FIGS. 5 and 15), a mounting guide 800 (illustrated in FIG. 8); a neck assembly 200, including an attachment blank 250 (illustrated in FIG. 7) and a threaded component 260 (illustrated in FIG. 3); a torque sensor 300 (illustrated in FIGS. 4 and 12); and a processor and associated data store (e.g., memory), such as may be included on a circuit board containing a microprocessing chip and memory (generally shown in FIG. 2).

Figure 2:
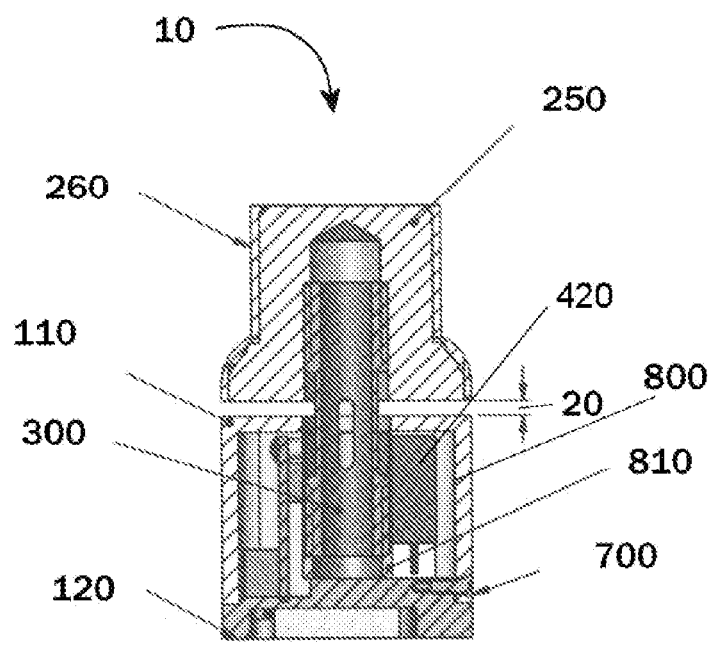
FIG. 2 is a cross sectional view of one embodiment of an instrumented container.
Figure 3:
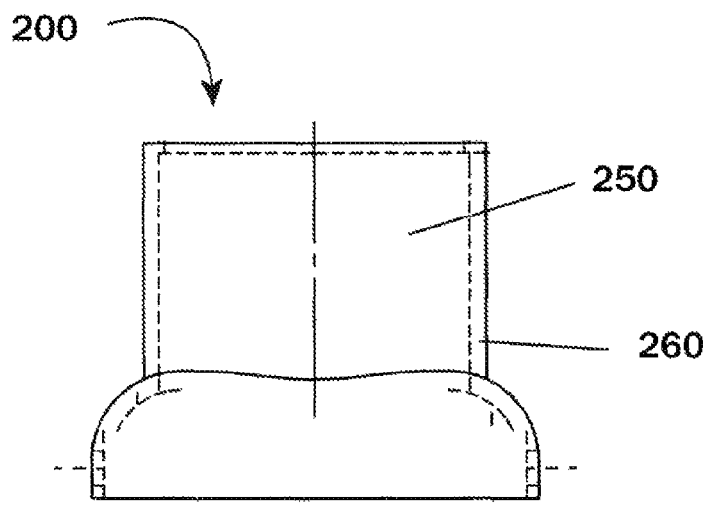
FIG. 3 is a side view of one embodiment of a neck assembly.
Figure 8:
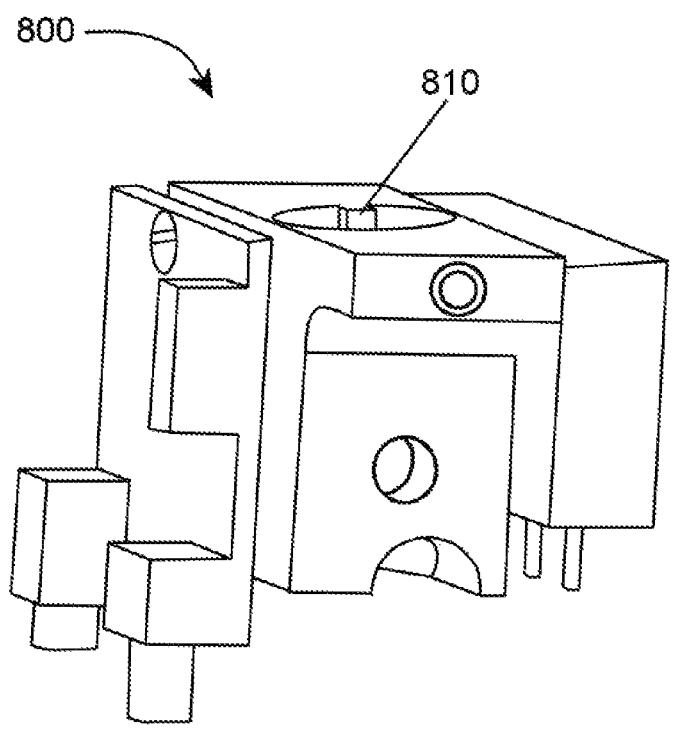
FIG. 8 is a side elevational view of a mounting guide.
Figure 9:
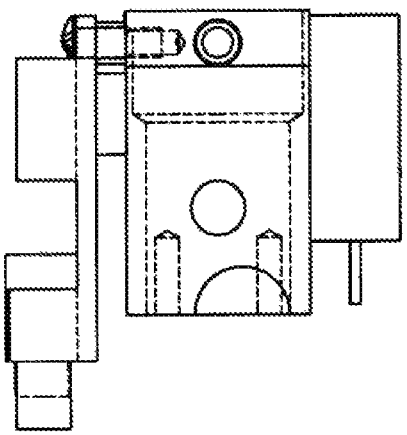
FIG. 9 is a cross sectional view of one embodiment of a mounting guide.
Figure 10:
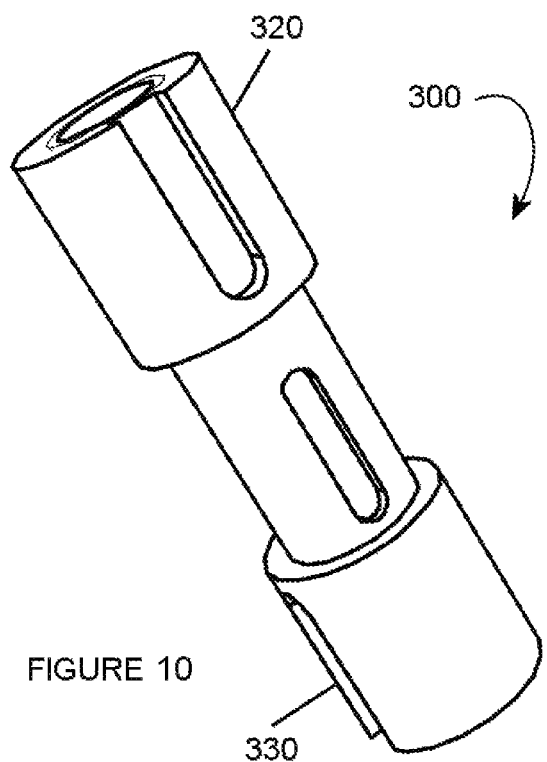
FIG. 10 is an elevated view of one embodiment of a keyed torque sensor.
Figure 11:
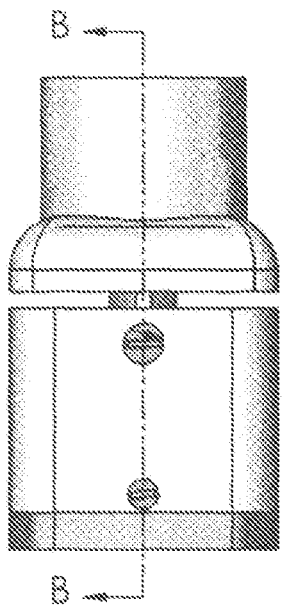
FIG. 11 is a side view of one embodiment of an instrumented container.

As is illustrated in FIG. 2, container assembly 100 includes a container body 110 and a base 120. The lower portions of an exemplary container assembly 100 have external dimensions and a contour which match the external dimensions and contour of the lower body portion of the production container. The interior of exemplary container body 110 is at least partially hollow, as can be seen in FIG. 2, to accommodate instrumentation which is adapted to measure and record data representative of the torque applied during the capping process. Such data may be referred to herein as torque data. The instrumentation is in supporting connection with a mounting guide 800. An exemplary mounting guide 800 is adapted to fit within the hollow portion of exemplary container body 110 and includes an internally keyed portion 810, as illustrated in FIG. 8, adapted to mate with an externally keyed torque sensor 300, as can be seen in FIG. 11. An exemplary mounting guide 800 is also in supporting connection with a processor, memory, and a battery 420.

Although the container assembly 100 is described and shown herein as separate elements so that the components thereof may be more easily discussed, the elements need not be manufactured as separate elements. Similarly, although the body assembly and body portions of the instrumented container 10 and the production container are described as "lower," containers are increasingly being produced that are designed to rest in positions which are inverted or sideways from the formerly traditional position in which the threaded opening is at the top. The use of the word "lower" or "upper" herein is not intended to be limiting, but rather to distinguish the holding portion of the container from the threaded opening thereof.

Figure 7:
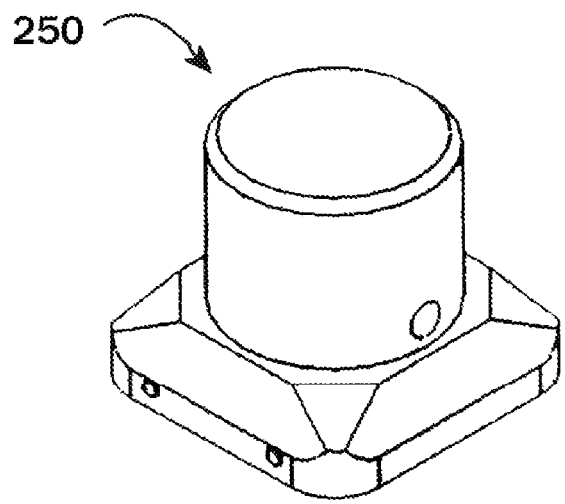
FIG. 7 is a side elevational view of one embodiment of an instrumented container attachment blank.
Figure 14:
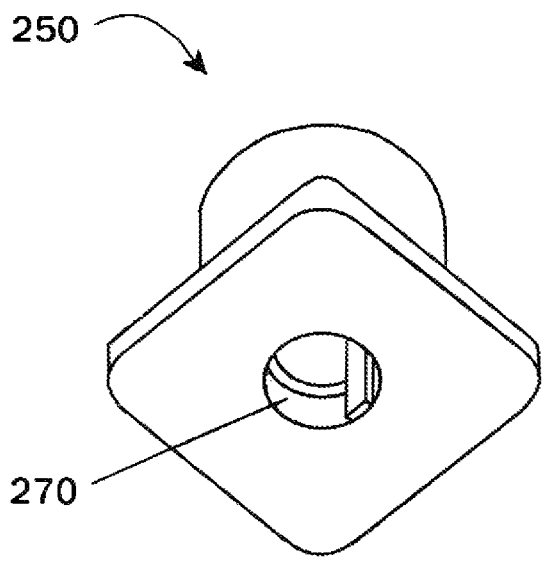
FIG. 14 is a perspective view from below of an attachment blank.

As illustrated in FIG. 7, an exemplary attachment blank 250 has an external contour similar to the contour of the threaded portion of the production container, with slightly smaller dimensions. An exemplary attachment blank 250 also includes internally keyed portion 270 (FIG. 14) which is adapted to mate with an externally keyed portion of a torque sensor 300 (FIG. 11). An exemplary threaded component 260 is formed from a portion of a representative production container of the type desired to be capped. The threaded component 260 is then affixed to the exterior of the attachment blank 250, to form neck assembly 200, as illustrated in FIGS. 1 and 2.

Threaded component 260 is typically made from the open threaded portion of a representative production container, so that torque data measurements from the instrumented container 10 accurately reflect the torque that will be applied to the actual containers being capped. This open threaded portion of the production container generally comprises the upper portion of a representative production container and includes a threaded open neck. In containers having a typical bottle shape, the open threaded portion will also typically also include shoulders. Over time, threaded component 260 will wear down from repeated capping. Because threaded component 260 is removable, it can easily be removed and replaced with a new threaded component 260 at minimal cost. This extends the useful life of the instrumented container as beyond the life of individual threaded components 260 which naturally degrade over time because of the repeated threading and unthreading. These worn out portions can be replaced numerous times over the life of the remainder of the body and internal components.

Figure 4:
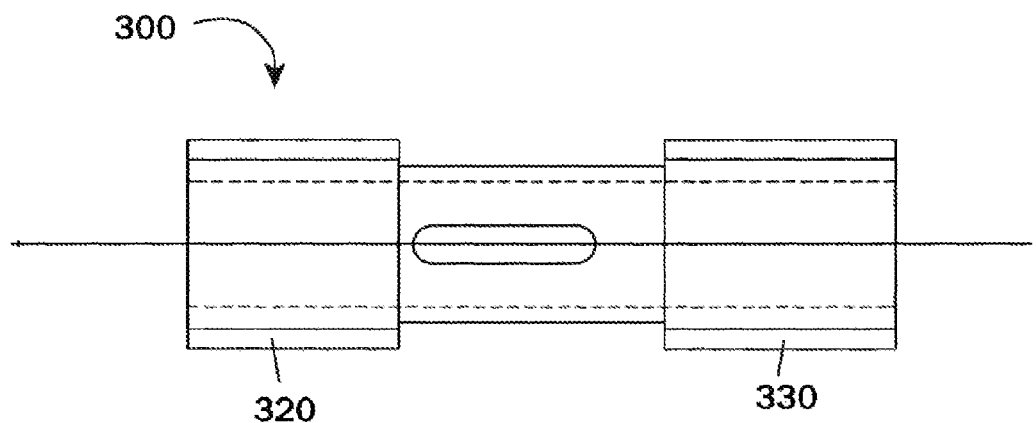
FIG. 4 is a side view of one embodiment of a torque sensor.

Illustrated in FIG. 4 and FIG. 11 are exemplary torque sensors 300. Torque sensor 300 in the exemplary embodiments illustrated in FIGS. 4 and 11 are strain gauge types. Torque sensor 300 in the exemplary embodiment illustrated in FIG. 11 is a customized strain gauge which is keyed on first and second ends 320, 330. First and second ends 320 and 330 may be externally keyed to mate with internally keyed portions of the attachment blank 250 and mounting guide 800, respectively. The interlocking keys keep the sensor 300, the attachment blank 250, and the mounting guide 800 in rigid rotational relationship with each other in order to provide more accurate torque data. Although the torque sensor 300 is illustrated as being keyed, the connection between the sensor 300, the attachment blank 250, and the mounting guide 800 may also be threaded. Similarly, the torque data sensor may mate directly with the container body 110, or with portions of both the container body 110 and the mounting guide 800. As can be seen in FIG. 1, when assembled, there is a gap 20 between the container assembly 100 and attachment blank 250. Although the embodiment discussed above uses a strain gauge type torque sensor, other torque sensors well known to those skilled in the art may be used, as well.

Figure 5:
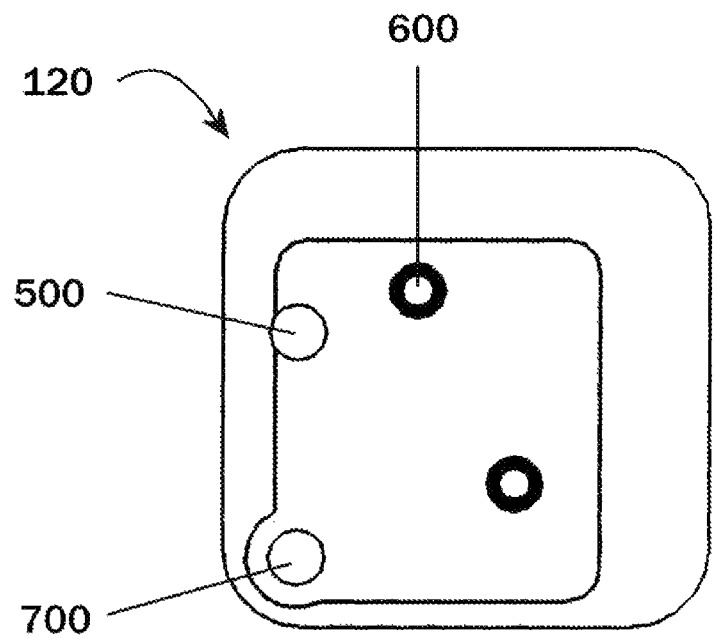
FIG. 5 is a bottom view of one embodiment of an instrumented container.
Figure 6:
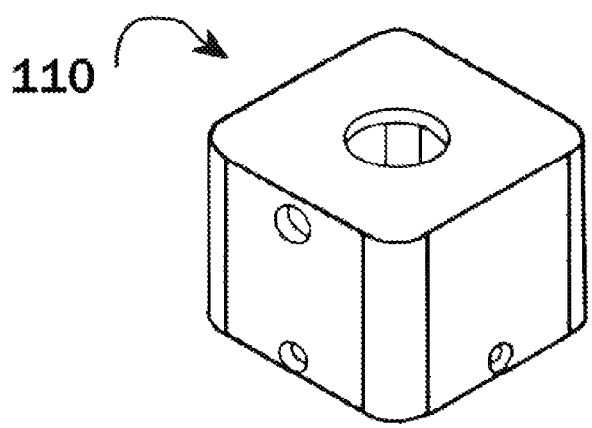
FIG. 6 is a side elevational view of one embodiment of an instrumented container body.

As can be seen in FIG. 5, an exemplary embodiment also includes a switch 500, a communication port 600, and an LED 700. Although in the exemplary embodiment communication port 600 is illustrated as a connector for a serial cable, in other embodiments communication port 600 may be a wireless transceiver, an IR port, or any other means adapted to permit instrumented container 10 to communicate to computing device 900. Similarly, although in the exemplary embodiment illustrated switch 500 is a physical switch, the switch 500 may be a logical switch that may be "turned on" through wireless or electronic communication from application software on computing device 900.

An exemplary instrumented container 10 includes a processor 410 (not specifically shown) with embedded instructions (firmware) which may direct the processor 410 to perform a number of functions including but not limited to one or more of (1) accepting and storing calibration data, (2) accepting operational parameters such as the torque value at which sampling is to begin, the length of the sampling period, and the status of the instrumented container 10, (3) managing power for the instrumented container 10, (4) iteratively measuring electrical signals (5) converting the electrical signals received from the torque sensor 300 into standard torque units or amplified electrical signals using the calibration data, and (6) recording the torque values.

An exemplary instrumented container may also include a thermister 430 (not specifically shown) in operative connection with a processor and the torque sensor to measure temperature fluctuations during torque measurement sampling, and a memory (not specifically shown) in operative connection with the processor for storing measured torque and temperature data, and initialization or operational data. Additional functionality may be provided for. For example, a sleep timer function may be included which shuts the instrumented container 10 off after a predetermined period of time ("ST") without measured torque or communication from the application software. The processor 410 may also be programmed to cause the LED 700 to indicate information about the status of the instrumented container 10). For example, the LED may indicate various states by flashing on and off, flashing in different patterns, or using different colors. States which may be indicated include that the container 10 is initialized and ready for recording, done collecting data, sleep timed out, or it may indicate a battery state. Although the status signaling device is labeled an LED, other devices which may be programmed to visually, audibly, or electronically indicate a status or state may be substituted for an LED.

In addition to the instructions to be carried out by the on-board processor 410, an exemplary embodiment also includes an external computing device 900 and one or more software applications (not specifically shown). These software application may cause the computing device 900 to perform a number of functions including but not limited to (1) initially calibrating an instrumented container 10, (2) initializing an instrumented container 10, (3) downloading calibration and initialization data to an instrumented container, (4) uploading data from an instrumented container, (5) adjusting the recorded data to account for the influence of temperature on the electrical signals, (6) displaying the data graphically, and (7) saving the uploaded data in tabular and graphic formats.

Although computing device 900 is illustrated schematically as a standard standalone computer, it may instead be a dedicated device housing a processor, memory and sufficient user interface to carry out the functions described herein. Software applications may be in the form of firmware on a dedicated device, or they may be modules of a larger related software application.

Figure 19:
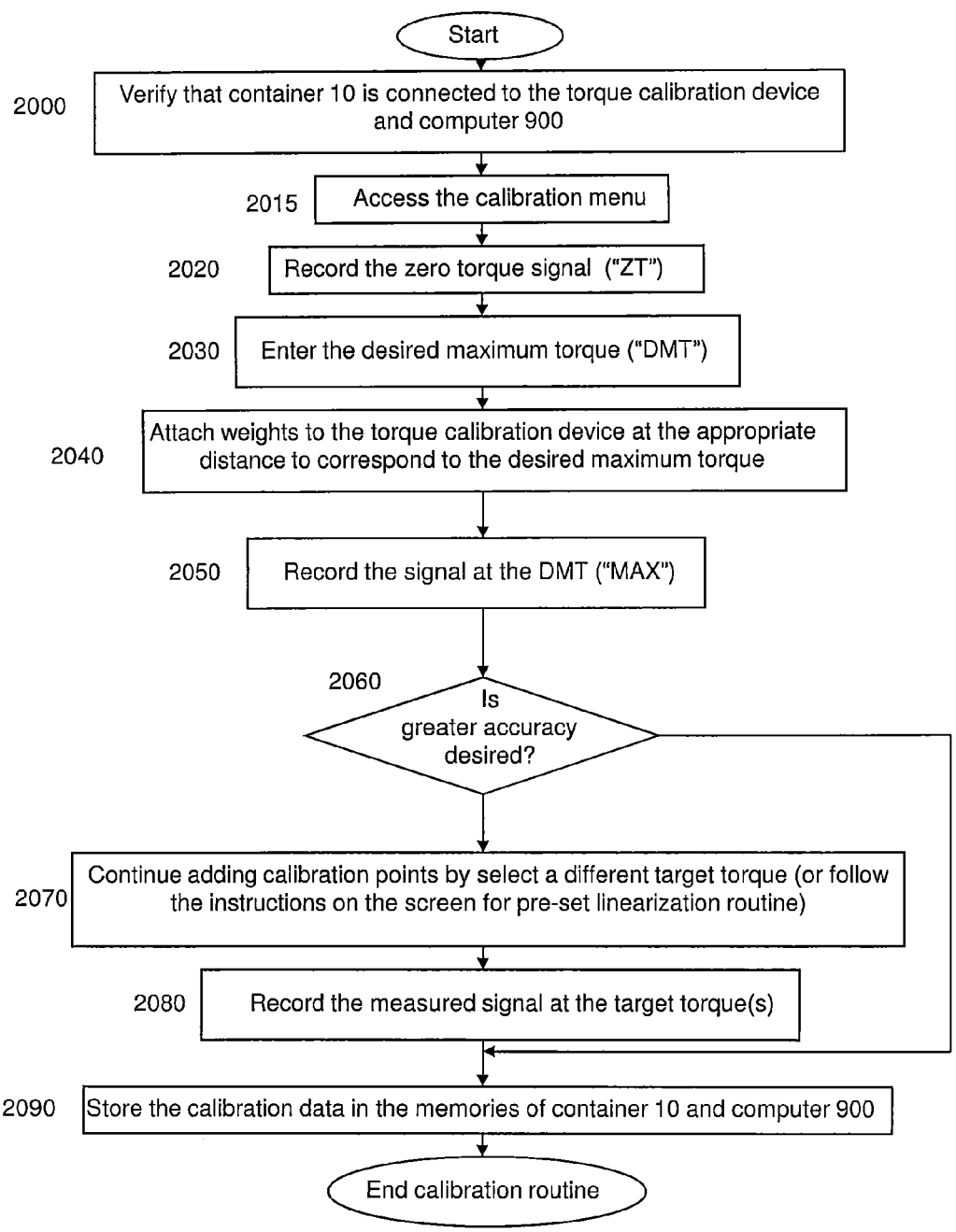
FIG. 19 is a flowchart of an exemplary method of logging torque data from calibration through uploading of data.

As can be seen in the flow chart in FIG. 19, when an instrumented container 10 is to be used to log data representative of applied torque, one of the first steps is to calibrate or verify any previous calibration of the container 10 (steps 1000-1030). The torque sensor 300 converts the applied torque into a measured electrical signal, the value of which can be recorded. In order to be able to convert the electrical signals into standard torque measurement units, the calibration data must include at least two signals which are objectively correlated to known applied torques so that the data produced corresponds to standard torque units.

If the container 10 has already been used, it may have been previously calibrated (step 1010). In that case, the data stored in the computing device 900 may be manually accessed using container identification information. Optionally, the software application may instruct the computing device 900 to accept a container identifier stored in the on-board memory of container 10 and to retrieve the calibration file automatically. Additionally, the software application may instruct the computing device 900 to compare the selected calibration file to the calibration data stored on the instrumented container, to notify the user if the data contained in the two files does not match, and to prompt the user to select another calibration file or to recalibrate the container 10. These steps are illustrated in steps 1010-1020 in FIG. 19.

Figure 20:
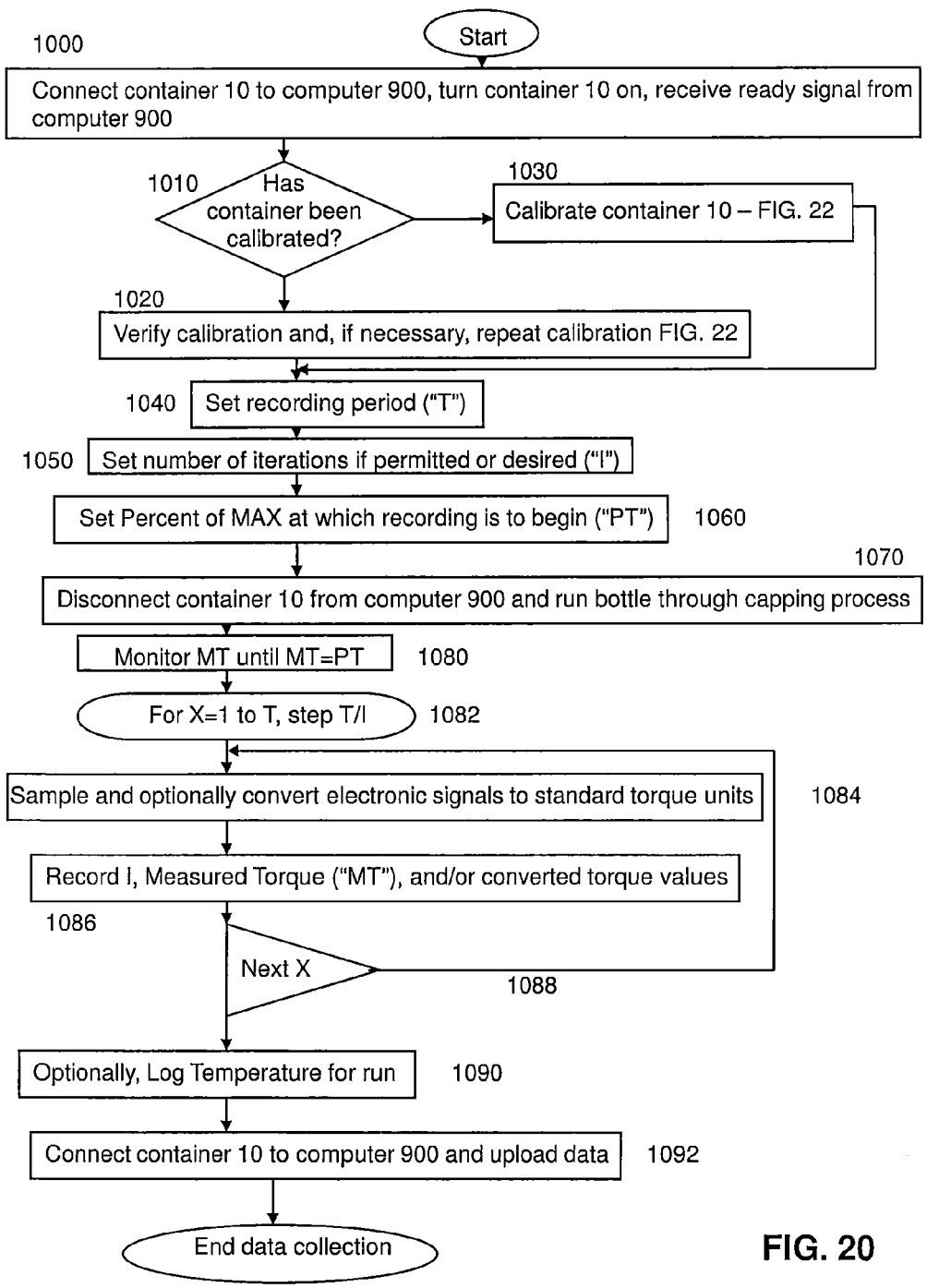
FIG. 20 is a flowchart of an exemplary method of container calibration.

If the container 10 has not been used before, the container will need to be calibrated to obtain the objective relationship to known applied torques (step 1030). The process of calibration is schematically illustrated in FIG. 20. An exemplary instrumented container 10 may be connected to an external computing device 900 using a serial connection cable to connect the communications port 600 to the serial port on the computing device 900. Once the connection is made, the switch 500 may be placed in the "on" position, and a message sent from the application software to the instrumented container that the container is ready to record data (step 1000).

Although the connection between the instrumented container 10 and the computing device 900 is described above as a serial communication, other means of communication adapted to transmit data from one electronic device to another which are known to those skilled in the art are within the scope of the invention described herein. Other nonlimiting examples of communication include wireless or infrared transmission.

Figure 13:
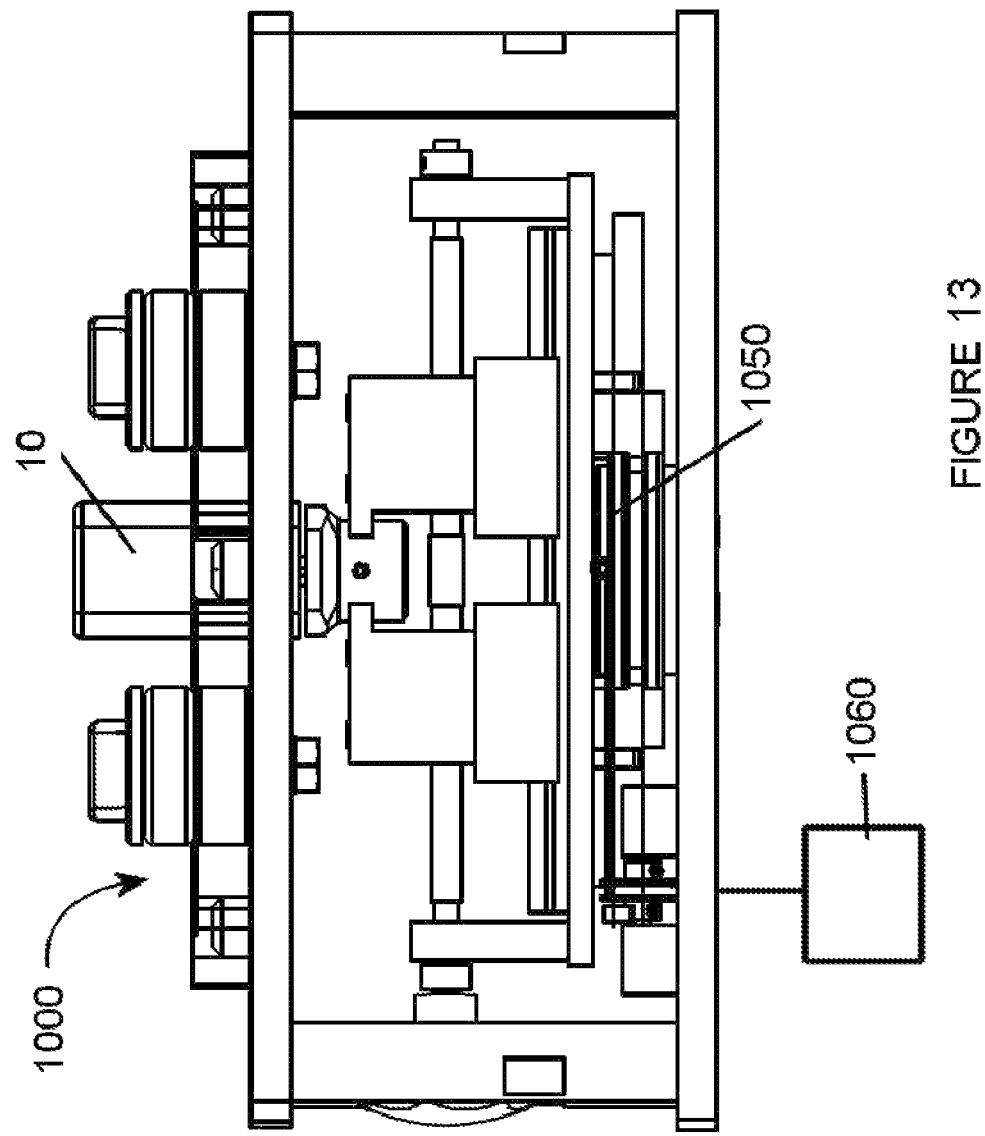
FIG. 13 is a back view of one embodiment of a torque calibration device.
Figure 16:
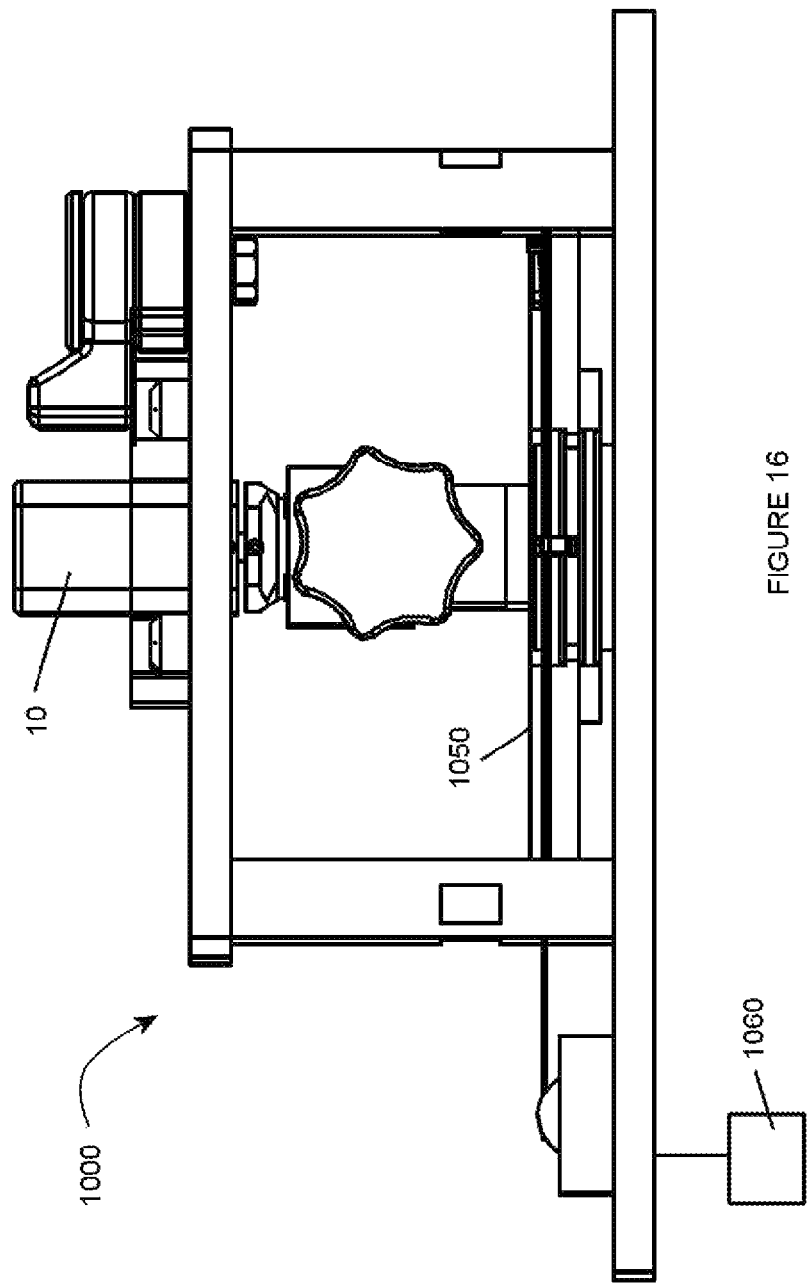
FIG. 16 is a side view of a torque calibration device.
Figure 17:
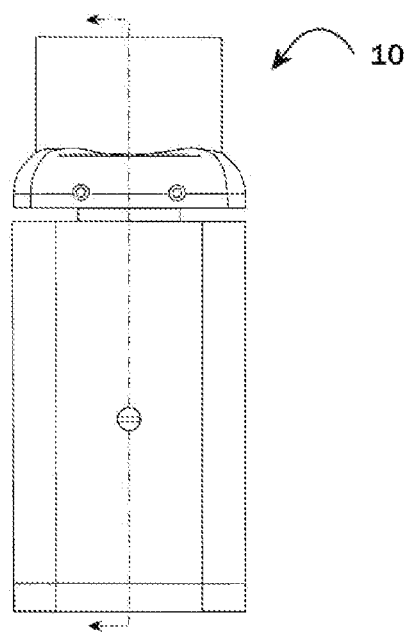
FIG. 17 is a side view of a second embodiment of an instrumented container.
Figure 18:
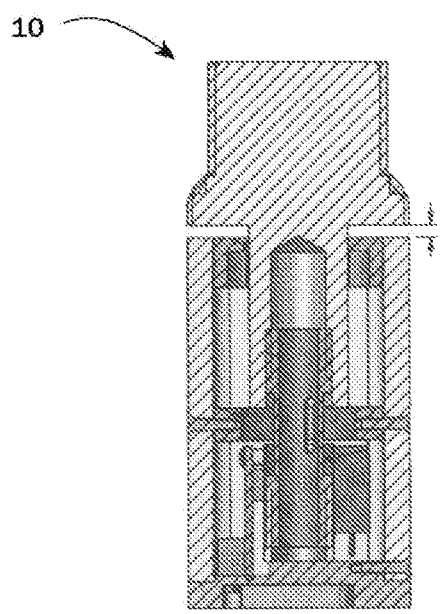
FIG. 18 is a cross sectional view of a second embodiment of an instrumented container.

During calibration, an initial torque measurement MT is taken when no torque is being applied to the instrumented container 10, as illustrated in FIG. 20. The measured value of the electrical signal with no torque applied may be set as the zero torque ("ZT") (step 2020). The desired maximum torque ("DMT") that will be applied to the container is entered through a user interface on computing device 900 (Step 2030). The instrumented container 10 may then be held steady in a vertical orientation in an initialization device 5000 designed to calibrate the instrumented container 10, as illustrated in FIGS. 13 and 16. Weights 5060 are placed at a specific distance along around a torque disc 5050 attached to container 10 so as to urge the torque disc 5050 in clockwise rotation (Step 2040). The weights are of a quantity and are placed at a distance to achieve the desired maximum torque DMT, in units of distance-weight, which may be applied to the container 10 during capping.

A second torque measurement MT is then taken (step 2050). The value of the electrical signal at this applied torque may be set as the maximum torque ("MAX") (step 2060), generally by directing the application software through the user interface to accept and record this value. One or more further linearization steps may be performed for more accurate calibration (Steps 2060-2080). This consists of placing each weight on the torque disc as prompted by the application software. Although the calibration of an instrumented container is illustrated and discussed in connection with a disc-type initialization device, it can also be accomplished using a conventional torque lever.

The calibration data may be stored in the on board memory (step 2090), as well as in the memory of the external computing device 900. Calibration data includes at least a container identifier, (measured) zero torque ZT, desired maximum torque DMT, and measured maximum torque MAX.

This process may be performed for each container 10 as it is needed. In the alternative, this process may be repeated for a plurality of containers, and the calibration data for each container 10 stored in association with a container identifier, for future use.

Once a container 10 is calibrated, or the appropriate calibration file is selected and verified, it may be used to obtain and record torque data during the application of a threaded screw cap, as discussed in FIG. 19, steps 1040-1090. The next step, prior to actually recording information, is an initialization process. As illustrated in FIG. 19, steps 1040-1060, the parameters for recording data are set and downloaded to the container 10. A user interface on computing device 900 may be used to enter the length of the desired recording period ("T") (step 1040), and the percentage ("PT") of the maximum torque MAX at which the iterative sampling and recording should begin (step 1060). The selection of these values may be made through the user interface on computing device 900. The number of iterations ("I") may be fixed, or the application software may permit the user to select a number of iterations (step 1050). A typical value for I is around 1000. Once the initialization values are set, they may be downloaded to container 10 via the serial or other communication link, and the container disconnected from computing device 900 (step 1070).

One or more calibrated and initialized containers 10 can then be run through the capping process to collect data for later review (step 1075).

FIG. 19 steps 1080 through 1090 discuss in an exemplary manner a method for logging torque data using instructions carried out by an embedded processor 410. When activated, if the instrumented container 10 has already been calibrated and initialized, an LED on the instrumented container 10 may indicate the state, such as by remaining solid green to indicate the instrumented container 10 has been initialized.

While an instrumented container 10 is being capped, the measured torque ("MT") is monitored to determine when it meets the predetermined percent ("PT") of the maximum calibration torque ("MAX") at which the instrumented container is to begin recording data (step 1080). By way of example and not limitation, the predetermined percent PT of maximum torque MAX may be 30%. Once the measured torque MT it reaches that level, data representative of the applied torque (such as electrical values corresponding to the torque) and optionally temperature, are sampled (step 1084) and recorded (step 1086). These samples may be recorded as measured electrical values or amplified electrical values, or may be converted to standard torque values prior to recording (step 1084). These values may be converted at the time of sampling, after all values are sampled, after uploading to computing device 900, or not at all if it is not necessary to know the torque in standard measuring units. For the exemplary predetermined percent PT mentioned above, when the measured torque MT reached 30% of MAX, iterative sampling and conversion to standard torque units, and recording begins.

This sampling, conversion, and recording is repeated for a fixed number of iterations ("I") spaced evenly throughout a predetermined period of time ("T") (steps 1082 through 1088). For purposes of illustration and not limitation, the number of iterations I may be 1000, and the predetermined sample period may be a few seconds, for example 2 seconds. In this example, measurements of torque are taken and recorded every 2/1000 seconds for two (2) seconds creating a total of 1000 measured torque MT values. In some exemplary embodiments, for each measured torque cycle MT value a temperature will also be recorded so that the torque may be adjusted to account for the impact the temperature had on the value of the electrical signal generated. Temperature may be recorded for each MT value, or once for a predetermined set of MT values.

Although in this exemplary embodiment the data is sampled, converted to standard torque units, and recorded, in other embodiments the data stored may be representative of the electrical signal and may be uploaded later to the software application on computing device 900 for conversion to standard torque units. If temperature data is recorded, either the firmware directing the operation of the processor 410, or the software application on computing device 900 may convert the stored electrical signal values from the container 10 to standard units, taking into account the impact of temperature on the electrical signal.

Figure 21:
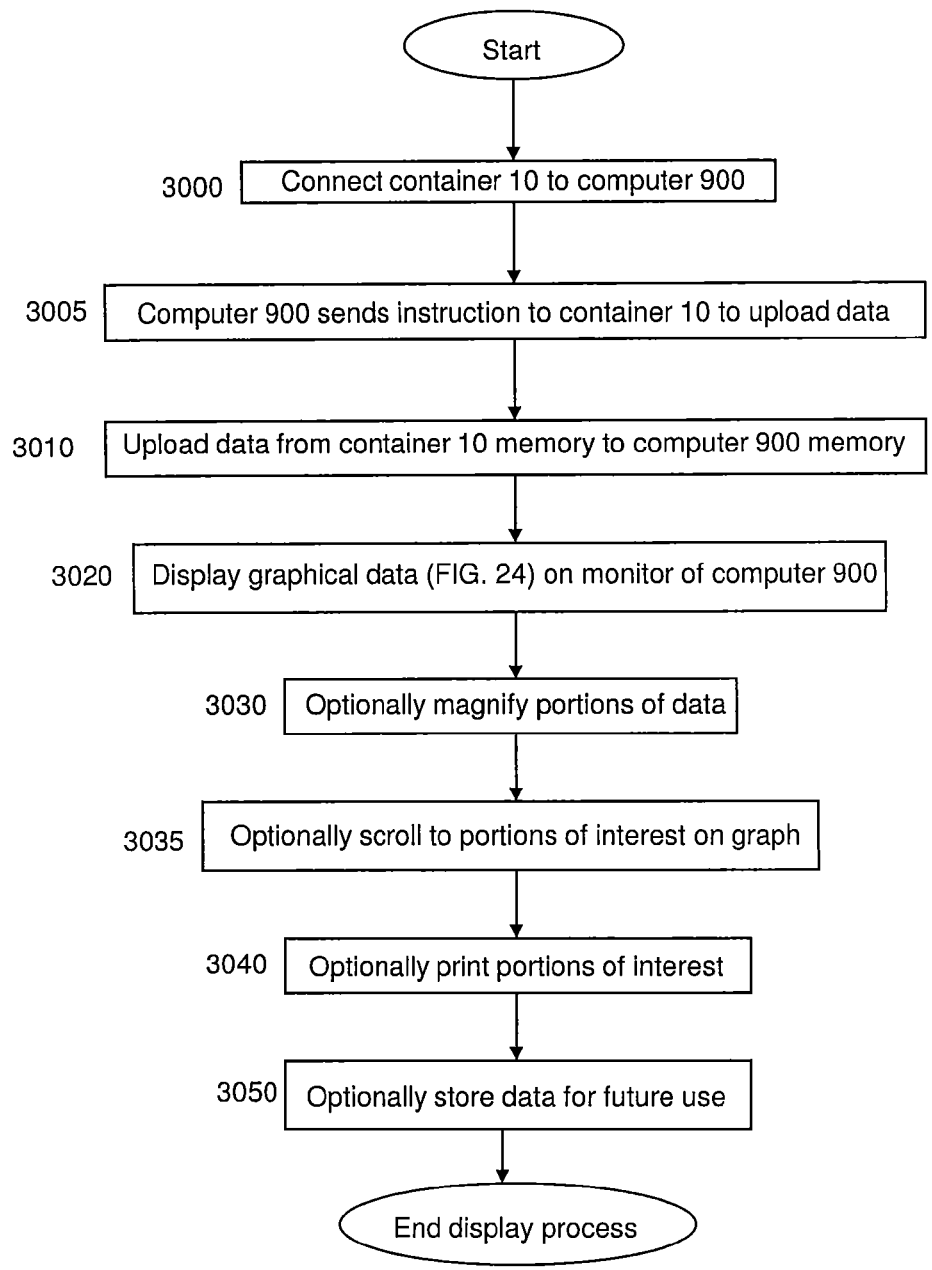
FIG. 21 is a flowchart of an exemplary method of uploading, processing, and viewing the torque data.
Figure 22:
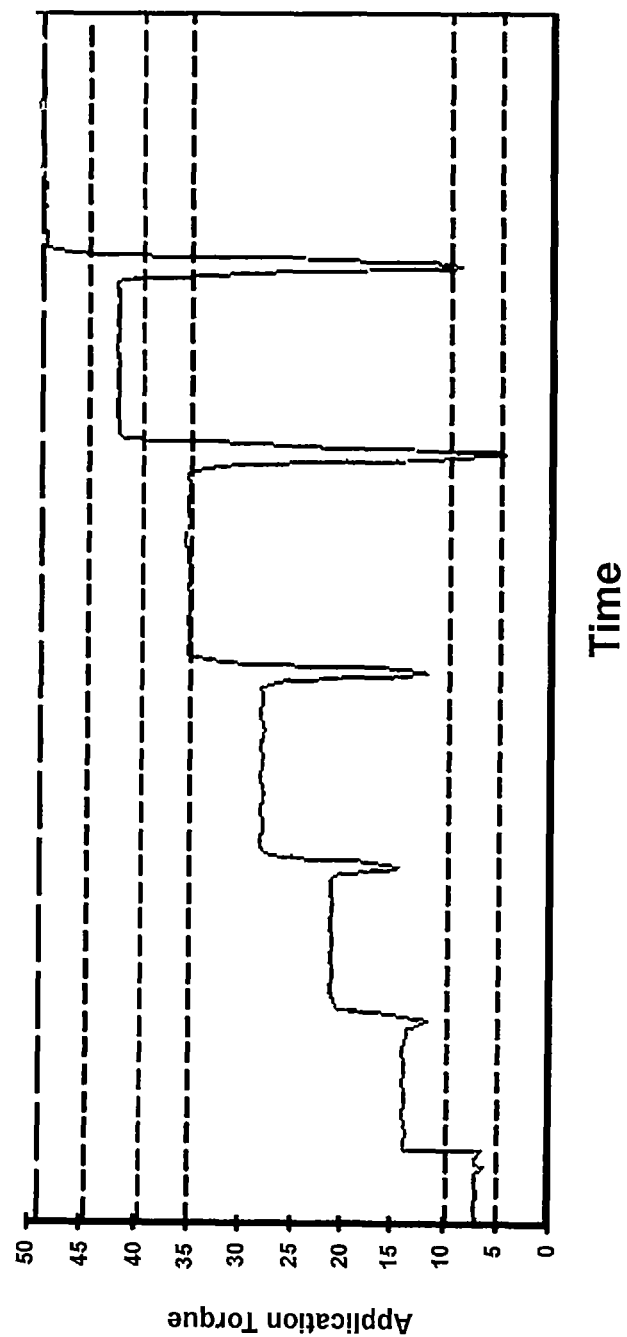
FIG. 22 is an exemplary portion of a graphical plot of torque data against time.

After data has been logged during the capping process of a container 10, the information recorded during the logging process may be uploaded to computing device 900 as illustrated as step 1092 in FIG. 19 and in more detail in FIG. 21. The container 10 may be connected to the computing device 900. When the software application on computing device 900 sends an instruction to the instrumented container 10 to upload the data (step 3005), the application accepts the representative data, which may include the recorded measured amplified electrical signal data and, optionally, temperature TEMP data for each set of iterations I logged on the on-board memory of the container 10 (steps 3010). This instruction is generally provided through a user interface on computing device 900. The application may then create a graphical display on the monitor of computing device 900 showing the measured torque MT plotted against time (step 3020). An exemplary graphical display is shown in FIG. 22. The appearance of the graphical display may be manipulated through a user interface on computing device 900 to review any area of interest on the graphical display by scrolling to a point of interest on the display (step 3035), zooming closer in on a smaller portion of the graphical display, or zooming farther out for a more global view of the graphical display (step 3030). Portions of the display may be printed out (3040), and the data may be stored for future reference (step 3050).

Measured torque MT may be influenced by slight variations in temperature associated with twisting the torque sensor. The uploaded measured torque MT data may be displayed as it was recorded (and converted to standard torque units), or the additional temperature data that was recorded from the thermister may be used to adjust the measured torque MT data to take into account the temperature variation, and the adjusted torque data may be displayed instead of the measured torque data.

A plurality of instrumented containers may be used in order to log data in a for a new capping setup, or for a capping setup in which there have been changes made such as the first use of a particular capping machine or a new run of production containers. As noted previously, even a change in dye can modify the relationship between application torque and removal torque. The use of an actual production container neck and screw cap allows precise adjustments to be made to accommodate any changes. It was also noted that different spindles may behave differently. The measurements for a particular spindle can be correlated to a particular instrumented container and adjustments may be made on a spindle by spindle basis.

Isolated instrumented containers may also be inserted in routine runs for quality control purposes, to ensure that the application torque remains in an acceptable range over time. Because they are identical in shape and size to the production containers being capped, no special adjustments need be made to insert them in the run. The data from instrumented containers may be used to trouble shoot problems with a particular capping machine and/or type of production container. The data provides much more information about the interaction between the capping machine and the container than does the single maximum torque measurement previously available.

Further, as capping machines develop and more sophisticated but less tangible ways of setting the application torque on the capping machines are introduced, the instrumented container provides a means to verify the accuracy of the application torque that the machine is set to apply. If the application torque does not match what was predicted, adjustments can be made, and the testing repeated until it is within an acceptable range. This avoids costly runs with actual production containers that end up not being properly capped.

Thus the new apparatus and method of the present invention achieves the above stated objectives, eliminates difficulties encountered in the use of prior devices and systems, solves problems, and attains the desirable results described herein.

In the foregoing description certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function, and shall not be limited to the structures shown herein or mere equivalents.

Having described the features, discoveries, and principles of the invention, the manner in which it is constructed and operated, and the advantages and useful results attained, the new and useful structures, devices, elements, arrangements, parts, combinations, systems, equipment, operations and relationships are set forth in the appended claims.

I claim:

1. An apparatus comprising:
    an instrumented container, wherein said instrumented container generally has the contour and shape of a threaded production container, which threaded production container includes a first body portion and a second threaded portion,
    said instrumented container comprising:
    a container assembly which is at least partially hollow and which has an external contour and size which corresponds to the external contour and size of the first body portion, and which further has an upper part which includes a generally flat portion and an internally keyed portion,
    a neck assembly having an external contour and size which corresponds to the second threaded portion, which neck assembly includes an attachment blank which is adapted for use in supporting relation with a threaded component which has the contour and size of the second threaded portion of a threaded container and further has a lower part which includes a generally flat portion and an internally keyed portion,
    a torque sensor extending between the container assembly and the neck assembly, creating a gap between the upper part of the container assembly and lower part of the neck assembly, having an externally keyed first end, and an externally keyed second end, wherein the externally keyed first and second ends of the torque sensor are adapted to releasably mate in a rotationally fixed relationship with the respective internally keyed portions of the lower part of the neck assembly and upper part of the container assembly, respectively,
    a processor within the container assembly in operative connection with the torque sensor, which processor is adapted to periodically sample data representative of torques from the torque sensor while the instrumented container is being capped,
    a memory within the container assembly in operative connection with the processor to receive said data, and
    a communication port on the container assembly.

2. The apparatus of claim 1 wherein the instrumented container assembly further comprises:
    a container body which has a hollow interior and an external contour and size which corresponds to the external contour and size of the first body portion and which has an upper part including a generally flat portion,
    a mounting guide which is adapted to fit within the container body, to accept mounted thereto internal components including a processor, memory, and battery, and which has an internally keyed portion adapted to releasably mate in fixed rotational relationship with the externally keyed second end of the torque sensor,
    a base which is adapted to close a lower portion of the container body, and which base includes said communication port.

3. The apparatus of claim 1, wherein the container assembly includes a status indicator device which is adapted to be responsive to the processor to receive a status and to provide a signal indicative of the status of the instrumented container.

4. The apparatus of claim 1 wherein the processor is adapted to turn the instrumented container off after a predetermined period of inactivity.

5. The apparatus of claim 1 wherein the processor is operative to receive through the communication port one or more values selected from the calibration data group consisting of values representing the container identifier, desired maximum torque, measured maximum applied torque, torque value at which data sampling is to begin, percentage of measured maximum applied torque at which data sampling is to begin, sampling period, and number of samples.

6. The apparatus of claim 1 wherein the instrumented container further comprises a thermister within the container assembly in operative connection with the processor to sample a plurality of values representative of temperature of the torque sensor, and wherein the memory is in operative connection with the processor to receive said plurality of values.

7. The apparatus of claim 6 wherein the processor is adapted to convert sampled data representative of a plurality of torque into a plurality of values expressed in units of force times distance, including by using the plurality of values representative of temperature of the torque sensor to compensate for the effect of temperature on the sampled data.

8. The apparatus of claim 1 wherein the instrumented container further includes an external power switch.

9. The apparatus of claim 1 wherein the communications port is a serial port.

10. The apparatus of claim 1 wherein the communications port is a wireless transceiver.

11. The apparatus of claim 1 wherein the torque sensor further comprises a middle, and wherein the externally keyed portion of the first and second ends each includes at least one detent running from said end at least part way to the middle, and wherein the internally keyed portion of the neck assembly includes a cavity containing at least one projection corresponding to the at least one detent in the first end of the torque sensor which at least one projection is adapted to slidingly mate in fixed rotational relation with the at least one detent in the first end of the torque sensor, and wherein the internally keyed portion of the container assembly includes a cavity containing at least one projection corresponding to the at least one detent in the second end of the torque sensor which at least one projection is adapted to slidingly mate in fixed rotational relation with the at least one detent in the second end of the torque sensor.

12. The apparatus of claim 1 wherein the externally keyed portion of the first and second ends of the torque sensor are each threaded, and wherein the internally keyed portion of the lower part of the neck assembly contains a cavity that is threaded to mate with the first end of the torque sensor, and wherein the internally keyed portion of the upper part of the container assembly contains a cavity that is threaded to mate with the second end of the torque sensor.

13. The apparatus of claim 1 wherein the processor is adapted to convert sampled data representative of a plurality of torques into a plurality of values expressed in units of force times distance.

14. A system comprising:
the instrumented container of claim 1, and
a computing device adapted to
communicate to the instrumented container a torque level at which the processor in the instrumented container is to begin periodically sampling data representative of torque,
receive from the instrumented container said data, and
make said data available via an interface on the computing device.

15. An apparatus comprising:
an instrumented container comprising:
an upper portion and a lower portion, wherein the lower portion of the instrumented container includes an upper part which includes an internally keyed cavity and which lower portion has an external contour that generally corresponds to an external contour of a lower portion of a production container, wherein the upper portion of the instrumented container includes a lower part which includes an internally keyed cavity and which upper portion is adapted to accept mounted thereto a threaded component, wherein the threaded component has an external contour that corresponds to an external contour of an upper portion of the production container;
a torque sensor extending between the lower portion and upper portion of the instrumented container including externally keyed first and second ends which are adapted to releasably mate with the internally keyed upper and lower portions of the instrumented container, wherein the upper portion and the lower portion of the instrumented container are spaced apart when the respective keyed portions are mated with each other, and wherein the torque sensor is operative to output a plurality of data representative of levels of torque applied to the upper portion of the instrumented container relative to the lower portion of the instrumented container;
a data store and a processor mounted within the instrumented container, wherein the processor is operative to store in the data store, a plurality of data from the torque sensor representative of levels of torque applied to the threaded component.

16. The system comprising:
an external computing device including a processor and a memory
the instrumented container of claim 15 further comprising a communication port, wherein the processor is further operative to store values representing calibration data in the data store including at least one of: the container identifier, desired maximum torque, measured maximum applied torque, torque value at which data sampling is to begin, percentage of measured maximum applied torque at which data sampling is to begin, sampling period, and number of samples, and wherein the processor is further operative to transmit calibration data to the external computing device for storage in the memory of the external computing device.

17. A method of obtaining information about the torque applied to an instrumented container during the capping process comprising:
a calibration step for at least one instrumented container comprising:
connecting the at least one instrumented container to a torque calibration device,
recording a first value representative of the signal from a torque sensor in the instrumented container when no torque is applied,
attaching a weight to the torque calibration device, and recording a second value representative of the signal from a torque sensor in the instrumented container when the torque associated with the attached weight is applied,
storing in the computing device data identifying the at least one instrumented container, and the first and second recorded values,
establishing communication between a computing device and an instrumented container wherein the instrumented container includes a neck assembly and a container assembly,
verifying that the memory in the instrumented container includes at least first and second values which correspond, respectively, to first and second known applied torques,
communicating, from the computing device to the instrumented container, a value which represents the applied torque at which the instrumented container is to begin regular periodic sampling of a signal from its internal torque sensor,
placing the instrumented container in a capping machine,
monitoring, under the control of a processor in the instrumented container while the instrumented container is being capped, at least one signal from the internal torque sensor, which signal represents the measured torque being applied to the neck assembly relative to the container assembly, and continuing such monitoring until the value of the signal reaches the value at which regular periodic sampling is to begin, thereafter, at regular intervals for a predetermined number of iterations, sampling signal data from the torque sensor representing at least the measured torque being applied, and recording the sampled data in a memory in the instrumented container, and communicating from the instrumented container to the computing device the data representative of measured torques.

18. The method of claim 17, wherein if it is determined in the verifying step that the memory in the instrumented container does not include at least first and second values which correspond, respectively, to first and second known applied torques, then the communicating step further includes communicating such first and second values to the instrumented container.

19. The method of claim 17 wherein in the thereafter step, the signal data sampled also includes values representative of the temperature of the torque sensor, and wherein the method further includes an adjusting step in which the computing device uses the temperature of the torque sensor to adjust the data representing the measured torque being applied in order to correct for the impact of the temperature of the torque sensor on the signal.

* * * * *